W. SLUYTER.
AUTOMATIC RETAINER.
APPLICATION FILED NOV. 25, 1921.
1,433,748.
Patented Oct. 31, 1922.
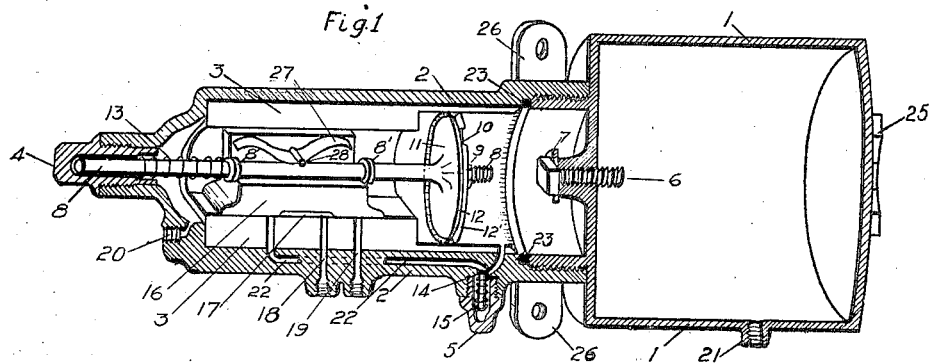
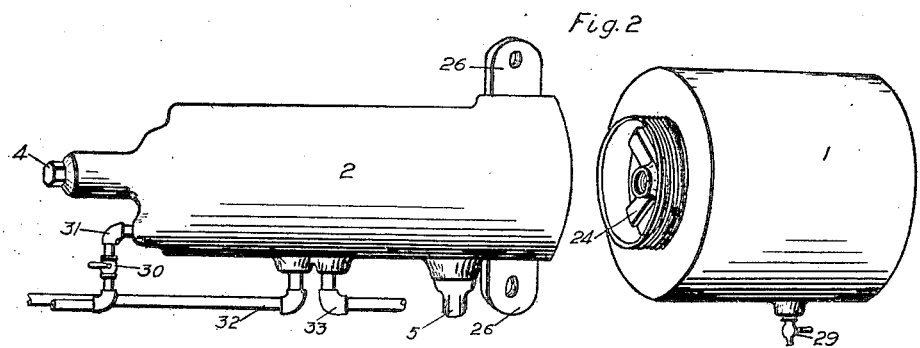
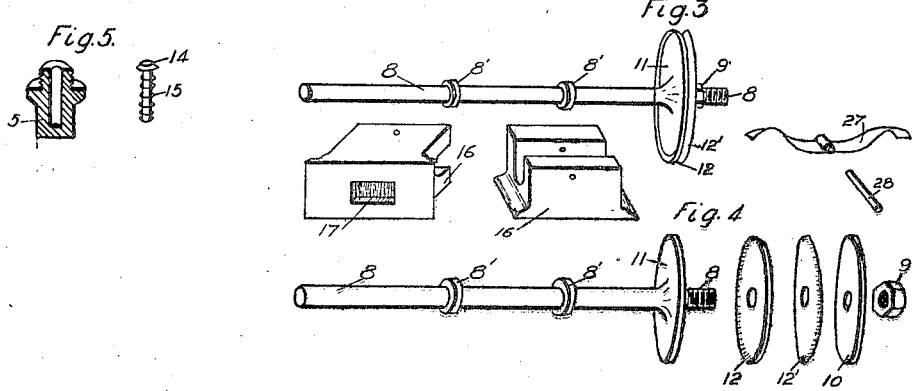
WITNESSES
INVENTOR
William Sluyter.

Patented Oct. 31, 1922.

1,433,748

UNITED STATES PATENT OFFICE.

WILLIAM SLUYTER, OF SAMOA, CALIFORNIA, ASSIGNOR OF ONE-HALF TO FRANK THOMPSON, OF EUREKA, CALIFORNIA.

AUTOMATIC RETAINER.

Application filed November 25, 1921. Serial No. 517,763.

*To all whom it may concern:*

Be it known that I, WILLIAM SLUYTER, a citizen of the United States, residing at Samoa, in the county of Humboldt, State of California, have invented certain new and useful Improvements in an Automatic Retainer; and I do declare the following to be a full, clear, and exact description of the invention, such as will enable others skilled in the art to which it appertains to make and use the same.

My invention relates to an automatic retainer.

One of the objects of my invention is to provide a retainer that automatically retains and releases by operation of the air through the brake pipe and auxiliary reservoir.

Another object is to provide a retainer that will automatically retain the pressure in the brake cylinder.

Another object is to provide a retainer that will automatically and safely retain the pressure in the brake cylinder while the auxiliary reservoir is being recharged.

Another object is to provide a retainer that will automatically release the pressure in the brake cylinder when the auxiliary reservoir is fully charged.

Another object is to provide a retainer which is automatically operated and controlled.

Another object is to provide a retainer which is automatically and immediately ready to retain or release at all times.

Another object is to provide a retainer which will automatically release all brakes at the same time.

Another object is to provide a retainer which will absorb shocks by releasing all brakes at the same time.

Another object is to provide a retainer which will permit the auxiliary reservoir to be charged within a few pounds of normal while the brakes are retained.

Another object is to provide a retainer which will retain the full braking power.

Another object is to provide a retainer which will hold all the braking power of the pressure carried in the auxiliary reservoir.

Another object is to provide a retainer that will not restrict the exhaust further than the restriction of the triple exhaust.

Another object is to provide a retainer that can be easily applied to all triples in use.

Another object is to provide a retainer that can be used in conjunction with all makes of hand retainers.

Another object is to provide a retainer that will not be affected by slight variations.

Another object is to provide a retainer which is convenient to manipulate.

Another object is to provide a retainer that can be easily connected to cars for operation.

Another object is to provide a retainer which is composed of few and simple parts and may be manufactured at a comparatively slight cost.

Another object is to provide a retainer which is strong, durable and compact.

Another object is to provide a retainer which can be repaired without disconnecting the pipes or removing retainer from car.

Another object is to provide a retainer which will operate with speed and precision and thereby save time and labor.

Other objects and advantages may become apparent to persons who read the following details of description in connection with the accompanying drawings.

In the drawings illustrating the principles of this invention and the best mode now known to me of applying these principles; Figure 1, is a vertical section of the entire apparatus; Figure 2, a perspective view showing the end of the pressure; and an outside view of piston chamber showing pipe connections; Figure 3, a view of the piston assembled; two views of the slide valve, one an upright position, the other the lower face showing the cavity; and spring and spring pin; Figure 4, a view of the piston with the parts disassembled; and Figure 5, a view of the check valve, check valve spring and check valve cage.

Referring to the drawings in detail similar numerals correspond with similar parts throughout the several views.

Casing 1, is threaded to screw into casing 2, forming air tight chambers on each side of the piston 10, 11, 12, 12'. The piston chamber has a brass bushing 3, against which the piston ring, 10, 11, 12, 12' works tightly; 12, 12', are leather rings with edges crimped in opposite directions and made air tight by being held tightly against 11, by washer 10; 10, being forced by nut 9, on the threaded part of the piston spindle 8. 8, is the piston spindle which words the slide valve 16, by the shoulders 8', 8'; the slide valve 16, works on the slide valve base 3, so as to disconnect ports 18, and 19, when in retaining position and connects said ports by cavity 17, when in released position; slide valve 16, also covers port 22, when in retaining position. The nut 4, is threaded to screw in end of casing 2, and has a hollow center to permit the entrance of the end of the spindle 8, and to stop the travel thereof when in full retaining position; the spring 13, on spindle 8, is to absorb shock of spindle and valve and hold said valve in release position when pressure is equalized. The nut 5 is threaded on the outside and also has a spring 15 in hollowed center arranged so as to rest against check valve 14. The set screw 6 has a jam nut 7, to hold adjustment of set screw 6, when set for proper action of piston spindle. Port 18, connects with the triple exhaust. Port 19 connects with atmosphere, or hand retainer. Port 20 connects automatic retainer with auxiliary reservoir. Port 21 is for bleeder 29. Port 22, allows air from auxiliary reservoir to pass into pressure chamber through check valve 14, when valve 16, is in release position. 23, is a rubber gasket. 24 are cross bars cast with the casing 1. 25, is a socket nut cast on end of casing 1, for screwing or unscrewing pressure chamber. 26, is a bracket provided on casing 2, for fastening retainer in place. 27, is a spring to hold slide valve 16 in place on slide valve base 3. 28, is a pin to fasten spring 27, in slide valve 16. 29, is a bleeder for air pressure chamber, it also may be used to bleed the auxiliary reservoir. 30, is a cut out provided in pipe connecting auxiliary reservoir and automatic retainer. 31, is pipe connecting auxiliary reservoir and automatic retainer. 32, is pipe connecting the triple exhaust and automatic retainer. 33, is pipe connecting the automatic retainer and hand retainer.

My new automatic retainer is used as follows:

The automatic retainer is subject to the train brake pipe pressure through port 20 being connected to the auxiliary reservoir by a pipe which permits the air pressure to pass freely to and fro between the auxiliary reservoir and automatic retainer. As the pressure comes from the auxiliary reservoir the piston is forced back into released position and the slide valve is thereby moved coincidentally into released position connecting port 18 with port 19 by cavity 17, permitting the pressure in the brake cylinder to escape by port 18, cavity 17, and port 19 to the atmosphere thus releasing the brakes. Port 22, is also uncovered when slide valve is moved into released position. On the uncovering of port 22 the pressure is allowed to pass into the pressure chamber charging the pressure chamber with the same pressure as is in the auxiliary reservoir. When the brakes are applied, that is when the pressure is reduced in the auxiliary reservoir, the pressure will so be automatically reduced in the piston and slide valve chambers, though the pressure in the pressure chamber will be slightly reduced only by the travel of the piston as the check valve 14 and slide valve 16 will not permit the pressure to return through port 22, thus the piston will be moved forward by the pressure being greater on the pressure chamber side of the piston and the slide valve is moved coincidentally with the piston so ports 18 and 19 are disconnected. The travel of the piston reducing the pressure slightly in the pressure chamber assures the return of the slide valve into release position when pressure is restored in auxiliary reservoir as the pressure will not be equalized until the piston returns and reduces the space in the pressure chamber. Port 18 being connected to the triple exhaust by a pipe, the pressure in the brake cylinder can not escape until the pressure is restored in the auxiliary reservoir to equal the pressure in the pressure chamber so as to force the slide valve into released position by the action of the piston when forced back into released position by the pressure being greater on the piston chamber side. Should the piston or slide valve stick from any cause the entire auxiliary reservoir pressure would be applied on the piston ring to force it into released position, as the pressure could not get into the pressure chamber to equalize the pressure on both sides of piston rings until port 22 is uncovered by the slide valve. Port 19 may be connected to the hand retainer so if for any reason my automatic retainer should be cut out the same method in use today could again be restored to or should some road not equip its cars with the automatic retainers and it became necessary to run a car or cars equipped with automatic retainers in with cars not so equipped then the automatic retainer could be cut out and the hand retainer could be used on all cars alike. The cut out or the retainer is very simple, a cut out valve is placed in the pipe connecting the auxiliary reservoir with the automatic retainer, the valve is closed and the bleeder in the pressure chamber is opened and the spring 13 places and holds the slide valve in release position thereby connecting the hand retainer with the triple exhaust the same as before automatic retainer was attached. The length of travel of the piston is regulated by the set screw 6 so that cavity 17 will connect ports 18 and 19 with precision. The set screw adjustment is held firmly in place by the jam nut 7. Nut 4 is used as a stop for piston in retaining position. Slide valve 16 is held in place on slide valve seat by spring 27, the piston spindle 8 sets in the groove of the U shaped slide valve and the shoulders 8', 8' on the spindle 8 works against the slide valve thereby moving the slide valve as the piston moves. The shoulders 8', 8' are adjusted for a slight play so as not to move the slide valve with slight variations of pressure, as the piston ring being air tight the piston will move with the slightest change of pressure on either side thereof. The hanger 26 is cast on casing 2 so the retainer may be fastened on the cars and the pressure chamber removed without having to disconnect the pipes or remove the retainer from the cars thereby making it easy to repair all the working parts of the retainer, as the pressure chamber can be removed with a socket or any adjustable wrench, by means of the socket nut arrangement on the end of the pressure chamber. The check valve 14 can be removed and repaired or adjusted by nut 5. The rubber gasket 23 and the crimped leather rings 12 and 12' are used in order to make the pressure chamber perfectly air tight. In this way my retainer automatically retains any and all braking power applied to the brake cylinders and will automatically retain said braking power until auxiliary reservoir is fully recharged, and then will automatically release the brakes. It will be found also that my automatic retainer can and will be used to keep the auxiliary reservoir at full braking power at all times no matter how often brakes are applied. Further, time heretofore wasted, setting and opening the hand retainers, will be saved and more and better time and work may be accomplished with my new automatic retainer than has heretofore been possible by other methods. In case the retainer has been subjected to a high brake pipe pressure and the pressure is changed to a lower pressure then the bleeder on the pressure chamber is opened to reduce the pressure therein to the pressure carried in the brake pipe. In case a retainer becomes faulty the same can be cut out by the cut out without interfering with any of the other equipment.

Although I have described the embodiment of my invention very specifically, it is not intended to limit my invention to these exact details of construction and arrangement of parts, but I may make minor changes within the scope of the inventive idea disclosed in the foregoing description and appended claims, and of course, the retainer may be made in various sizes and materials to suit the needs of all who use my new automatic retainer.

I claim:

1. In an air brake system consisting of a brake pipe, an auxiliary reservoir, a brake cylinder and a triple valve having a triple exhaust port; a combined automatic retainer, comprising a casing provided with pressure chamber, a piston chamber and a slide valve chamber, and connected with a passage leading from the auxiliary reservoir to the slide valve chamber to convey air pressure between the auxiliary reservoir and the slide valve chamber, also a passage leading from the slide valve chamber to the pressure chamber to convey the air pressure to the pressure chamber with a check valve in said passage to hold the air pressure in pressure chamber, a piston operating in the piston chamber and subject to the auxiliary reservoir pressure on one side and the pressure chamber pressure on the other side, a slide valve connected to and moving coincidentally with the piston and which is formed with a cavity adapted to connect the exhaust passage from the brake cylinder to the atmosphere, through triple exhaust, a spring to hold slide valve on slide valve base, also spring on spindle in slide valve chamber to absorb shock, and to assist in placing and holding slide valve in release position when auxiliary and retainer are fully charged.

2. In an air brake system consisting of a brake pipe, an auxiliary reservoir, a brake cylinder and a triple valve having a triple exhaust port; a combined automatic retainer, comprising a casing provided with a pressure chamber, a piston chamber and a slide valve chamber, formed with a single passage connecting with the auxiliary reservoir, another passage connecting with the pressure chamber, which passage has a check valve thus preventing the return of the pressure from the pressure chamber, a piston operating in the piston chamber subject to auxiliary reservoir pressure on the slide valve chamber side and by the pressure on the pressure chamber side, a slide valve connected with and moving coincidentally with the piston and which is formed with a cavity to convey the pressure from the passage leading from the brake cylinder through the triple exhaust to the passage or port leading to the atmosphere when in release position.

3. In an air brake system consisting of a brake pipe, an auxiliary reservoir, a brake cylinder and a triple valve having a triple exhaust port; a combined automatic retainer, comprising a casing provided with pressure chamber, a piston chamber and a slide valve chamber and formed with a single passage leading from the auxiliary reservoir to the slide valve chamber, and a single passage or port from slide valve chamber to air pressure chamber, said passage provided with a check valve, a piston connected to and moving coincidentally with the slide valve, and adapted to move said slide valve into retaining position when the pressure in the slide valve chamber, auxiliary reservoir and piston chamber on slide valve side of piston is reduced below said predetermined pressure in pressure chamber closing the passage connecting the brake cylinder through the triple exhaust with the atmosphere.

4. In an air brake system consisting of a brake pipe, an auxiliary reservoir, a brake cylinder and a triple valve having a triple exhaust port; a combined automatic retainer, comprising a casing provided with an air pressure chamber, a piston chamber and a slide valve chamber and formed with a single passage leading from the auxiliary reservoir to the slide valve chamber, and a single passage or port from slide valve chamber to air pressure chamber, said passage or port provided with a check valve, a piston connected to and moving coincidentally with the slide valve, and adapted to move said slide valve into released position when the air pressure in the slide valve chamber, auxiliary reservoir and piston chamber on slide valve side of piston, rises to the said predetermined pressure in the air pressure chamber, permitting the pressure in the brake cylinder to escape to the atmosphere through the triple exhaust.

5. In an air brake system consisting of a brake pipe, an auxiliary reservoir, a brake cylinder and a triple valve having a triple exhaust port; a combined automatic retainer, comprising a casing provided with pressure chamber, a piston chamber and a slide valve chamber and formed with a single passage leading from the auxiliary reservoir to the slide valve chamber, and a single passage or port from slide valve chamber to air pressure chamber, said passage provided with a check valve, a piston connected to and moving coincidentally with the slide valve, and adapted to move said slide valve into retaining position when the pressure in the slide valve chamber, auxiliary reservoir and piston chamber on slide valve side of piston is reduced below said predetermined pressure in pressure chamber closing the passage connecting the brake cylinder through the triple exhaust with the atmosphere, and also covering the port or passage leading from the slide valve chamber to the air pressure chamber.

6. In an air brake system consisting of a brake pipe, an auxiliary reservoir, a brake cylinder and a triple valve having a triple exhaust port; a combined automatic retainer, comprising a casing provided with pressure chamber, a piston chamber and a slide valve chamber and formed with a single passage leading from the auxiliary reservoir to the slide valve chamber, and a single passage or port from slide valve chamber to air pressure chamber, said passage provided with a check valve, which prevents the return of the pressure from the pressure chamber, a piston connected to and moving coincidentally with the slide valve, and adapted to move said slide valve into retaining position when the pressure in the slide valve chamber, auxiliary reservoir and piston chamber on slide valve side of piston is reduced below said predetermined pressure in pressure chamber closing the passage connecting the brake cylinder through the triple exhaust with the atmosphere, said air pressure chamber provided with a bleeder so the predetermined pressure in the air pressure chamber may be reduced to a lower pressure or the pressure of the brake pipe when the air pressure chamber has been subjected to a higher pressure.

7. In an air brake system consisting of a brake pipe, an auxiliary reservoir, a brake cylinder and a triple valve having a triple exhaust port; a combined automatic retainer, comprising a casing provided with an air pressure chamber, a piston chamber and a slide valve chamber and formed with a single passage leading from the auxiliary reservoir to the slide valve chamber, and a single passage or port from slide valve chamber to air pressure chamber, said passage or port provided with a check valve, which prevents the return of the pressure from the pressure chamber, a piston connected to and moving coincidentally with the slide valve, and adapted to move said slide valve into released position when the air pressure in the slide valve chamber, auxiliary reservoir and piston chamber on slide valve side of piston, rises to the said predetermined pressure in the air pressure chamber, permitting the pressure in the brake cylinder to escape to the atmosphere through the triple exhaust, said air pressure chamber provided with a bleeder so the predetermined pressure in the air pressure chamber may be reduced to a lower pressure or the pressure of the brake pipe when the air pressure chamber has been subjected to a higher pressure.

8. In an air brake system consisting of a brake pipe, an auxiliary reservoir, a brake cylinder and a triple valve having a triple exhaust port; a combined automatic retainer comprising a casing provided with a pressure chamber, a piston chamber, a piston, a silde valve chamber, and a slide valve connected to and moving coincidentally with the piston, and with a communicating port or passage provided with a check valve leading from the slide valve chamber to the pressure chamber, another communicating port or passage connecting the slide valve chamber with the auxiliary reservoir, and also an exhaust port or passage for connecting the brake cylinder through the triple exhaust with the atmosphere when in release position.

9. In an air brake system consisting of a brake pipe, an auxiliary reservoir, a brake cylinder and a triple valve having a triple exhaust port; a combined automatic retainer comprising a casing provided with a pressure chamber, a piston chamber and a slide valve chamber, a valve therein controlling said exhaust port, a piston separating said retainer into two elements, the slide valve chamber and the pressure chamber, a passage or port connecting said elements, a check valve in said passage or port which prevents the return of the pressure in the pressure chamber to the slide valve chamber, a pipe connecting said auxiliary reservoir with the said casing on the slide valve chamber or element side.

10. In an air brake system consisting of a brake pipe, an auxiliary reservoir, a brake cylinder and a triple valve having a triple exhaust port; a combined automatic retainer comprising a casing provided with a pressure chamber, and a slide valve chamber, a piston separating said chamber into two elements, a passage or port connecting said elements, a check valve in said passage which prevents the return of the pressure in the pressure chamber to the slide valve chamber, a pipe connecting said auxiliary reservoir with said casing on the slide valve chamber side, another pipe connecting the triple exhaust port with the hand retainer or atmosphere through the said casing, a slide valve in said casing controlling the escape of the pressure from the brake cylinder through the triple exhaust port, said valve moving coincidentally with the piston which is moved and operated by the variations of the pressure in the auxiliary reservoir.

In testimony whereof I have hereunto set my hand in the presence of two subscribing witnesses this 18th day of November, 1921.

WILLIAM SLUYTER.

Witnesses:
IRWIN T. QUINN,
FRANK THOMPSON.